(12) United States Patent
Kaiser et al.

(10) Patent No.: US 8,580,439 B1
(45) Date of Patent: Nov. 12, 2013

(54) INSULATOR COMPONENT DESIGN FOR MAINTAINING ELECTRODE ASSEMBLY COMPRESSION IN PRISMATIC MEDICAL CELLS

(75) Inventors: Donald F. Kaiser, Clarence Center, NY (US); Gregory A. Voss, Alden, NY (US)

(73) Assignee: Greatbatch Ltd., Clarence, NY (US)

( * ) Notice: Subject to any disclaimer, the term of this patent is extended or adjusted under 35 U.S.C. 154(b) by 874 days.

(21) Appl. No.: 12/561,668

(22) Filed: Sep. 17, 2009

Related U.S. Application Data

(60) Provisional application No. 61/098,875, filed on Sep. 22, 2008.

(51) Int. Cl.
*H01M 2/16* (2006.01)
*H01M 10/16* (2006.01)
*H01M 4/66* (2006.01)

(52) U.S. Cl.
USPC .......................... 429/246; 429/208; 429/245

(58) Field of Classification Search
USPC ......................................... 429/208, 245–246
See application file for complete search history.

(56) References Cited

U.S. PATENT DOCUMENTS 6,376,122 B1 * 4/2002 Cheeseman ..................... 429/99
2009/0081552 A1 * 3/2009 Shah et al. ..................... 429/245

* cited by examiner

*Primary Examiner* — Karie O'Neill Apicella
(74) *Attorney, Agent, or Firm* — Michael F. Scalise

(57) ABSTRACT

An electrochemical cell comprising a conductive casing housing an electrode assembly provided with a stack holder surrounding the electrode assembly is described. The stack holder is of a shape memory material that serves to maintain the anode and cathode in a face-to-face close physical proximity alignment throughout discharge. This is particularly important in later stages of cell life. As the cell discharges, anode active material is physically moved from the anode to intercalate with the cathode active material. As this mass transfer occurs, the cathode becomes physically larger and the anode smaller. This can lead to gaps forming between the anode and the cathode. However, the stack holder inhibits the formation of such gaps by maintaining a compressive force on the electrode assembly throughout cell discharge.

31 Claims, 9 Drawing Sheets

US 8,580,439 B1

INSULATOR COMPONENT DESIGN FOR MAINTAINING ELECTRODE ASSEMBLY COMPRESSION IN PRISMATIC MEDICAL CELLS

CROSS-REFERENCE TO RELATED APPLICATION

This application claims priority from U.S. Provisional Application Ser. No. 61/098,875, filed Sep. 22, 2008.

BACKGROUND OF THE INVENTION

1. Field of the Invention

The present invention relates generally to an electrochemical cell. More particularly, the present invention relates to an electrochemical cell having a stack holder that keeps the electrodes in proper electrochemical alignment and close proximity with respect to each other, even as their dimensions change during cell discharge.

2. Description of Related Art

A typical electrochemical cell used to power an implantable medical device comprises a casing housing an anode and a cathode. The anode and the cathode are physically segregated from each other, typically by enclosing at least one of them within an envelope or bag of insulative separator material. The separator is typically provided as a thin porous sheet material that is saturated with electrolyte and allows the transport of ions in the electrolyte there through. The anode and the cathode are generally formed as one or more respective plates of anode active material and cathode active material. The plates are then aligned face-to-face and spaced apart from each other by the separator material, to form an electrode assembly or electrode stack (a.k.a., cell stack) within the cell casing. In order to maximize discharge efficiency and stabilize the location of the electrodes within the casing, it is preferable that the electrode assembly be tightly fitted within the casing's walls while occupying as much internal volume as possible. It is understood that electrochemical cells perform most efficiently when the anode and the cathode plates are positioned in close physical proximity to each other. Close physical proximity minimizes the path length that current carrying ions must travel. Ultimately, the close physical proximity minimizes the electrical impedance of the cell as measured at the cell terminals.

During discharge of lithium anode-type cells, the thicknesses of the cathode and anode plates change. In lithium anode systems, the thicknesses of the cathode plates increase while those of the anode decrease, but the total thickness of the electrode assembly decreases continuously throughout discharge. This occurs because the rate of cathode thickness increase due to lithium intercalation is smaller than the rate of lithium consumption at the anode. As the overall electrode assembly thickness decreases, gaps can form between the anode plates and the cathode plates. The gaps may eventually be sufficient to allow the electrode assembly to move within the casing. That outcome is undesirable. As the electrodes form gaps, they may no longer be in close physical proximity to each other. As the cell discharges, this may result in an increase in electrical impedance along with increased cell resistance between the cathode and the anode, thereby causing lower pulse voltages (cell terminal voltage under conditions after an intermittent high current pulse load), faster cell polarization, greater voltage fluctuations, and in general, more delivered capacity variation.

What is needed is an electrochemical cell comprising an electrode assembly having an anode and a cathode that maintain close physical proximity to each other throughout the entire discharge life of the cell.

SUMMARY OF THE INVENTION

The present invention meets this need by providing an electrochemical cell comprising a conductive casing housing and an electrode assembly. The casing comprises a side wall structure extending to an open end closed by a lid. The electrode assembly comprises a cathode of at least a first plate of cathode active material, an anode of at least a first plate of anode active material, and a separator disposed at an intermediate location between the plates of cathode active material and anode active material. The cell further includes a stack holder surrounding or partially surrounding the electrode assembly. The stack holder may be formed as a bag that receives and envelopes the electrode assembly. Alternatively, the stack holder may be formed as a band disposed around a perimeter of the electrode assembly.

The stack holder is preferably made of a shape memory material with protrusions. Each protrusion applies a force along the electrode assembly surface or case wall surface. Taken together, the protrusions provide the electrode assembly with a uniformly distributed compressive force, sufficient in magnitude and compliance to maintain close physical contact between the active components in the electrode assembly over the life of the cell. In that manner, as the volume of the electrode assembly varies during cell discharge, the protrusions extend further to apply a uniformly distributed compressive force upon the electrode assembly to maintain the desired close physical proximity of the anode and the cathode plates.

Either or both of the anode and the cathode may be comprised of a plurality of plates of their respective electrode active materials. The cell may be provided in either a case-positive or case-negative configuration. Each of the respective plates of electrode active material may be enveloped in its own separator, with the entire electrode assembly then being encircled, enveloped or partially enveloped by the stack holder.

The foregoing and additional objects, advantages, and characterizing features of the present invention will become increasingly more apparent upon a reading of the following detailed description together with the included drawings.

BRIEF DESCRIPTION OF THE DRAWINGS

The present invention will be described by reference to the following drawings, in which like numerals refer to like elements, and in which.

The present invention will be described in connection with preferred embodiments, however, it will be understood that there is no intent to limit the invention to the embodiments described. On the contrary, the intent is to cover all alternatives, modifications, and equivalents as may be included within the spirit and scope of the invention as defined by the appended claims.

DETAILED DESCRIPTION OF THE PREFERRED EMBODIMENTS

Figure 1:
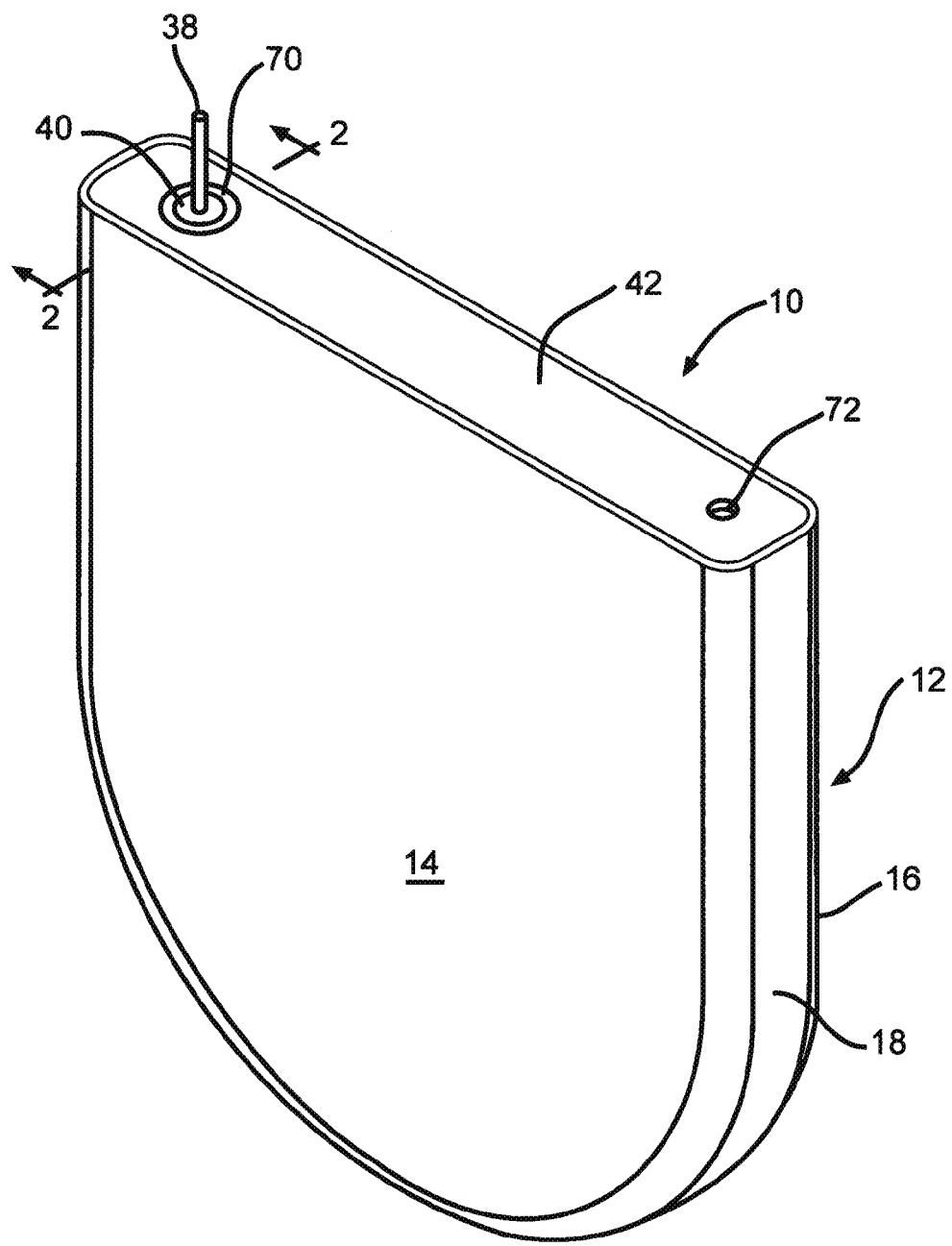
FIG. 1 is a perspective view of an electrochemical cell 10 according to the present invention.
Figure 2:
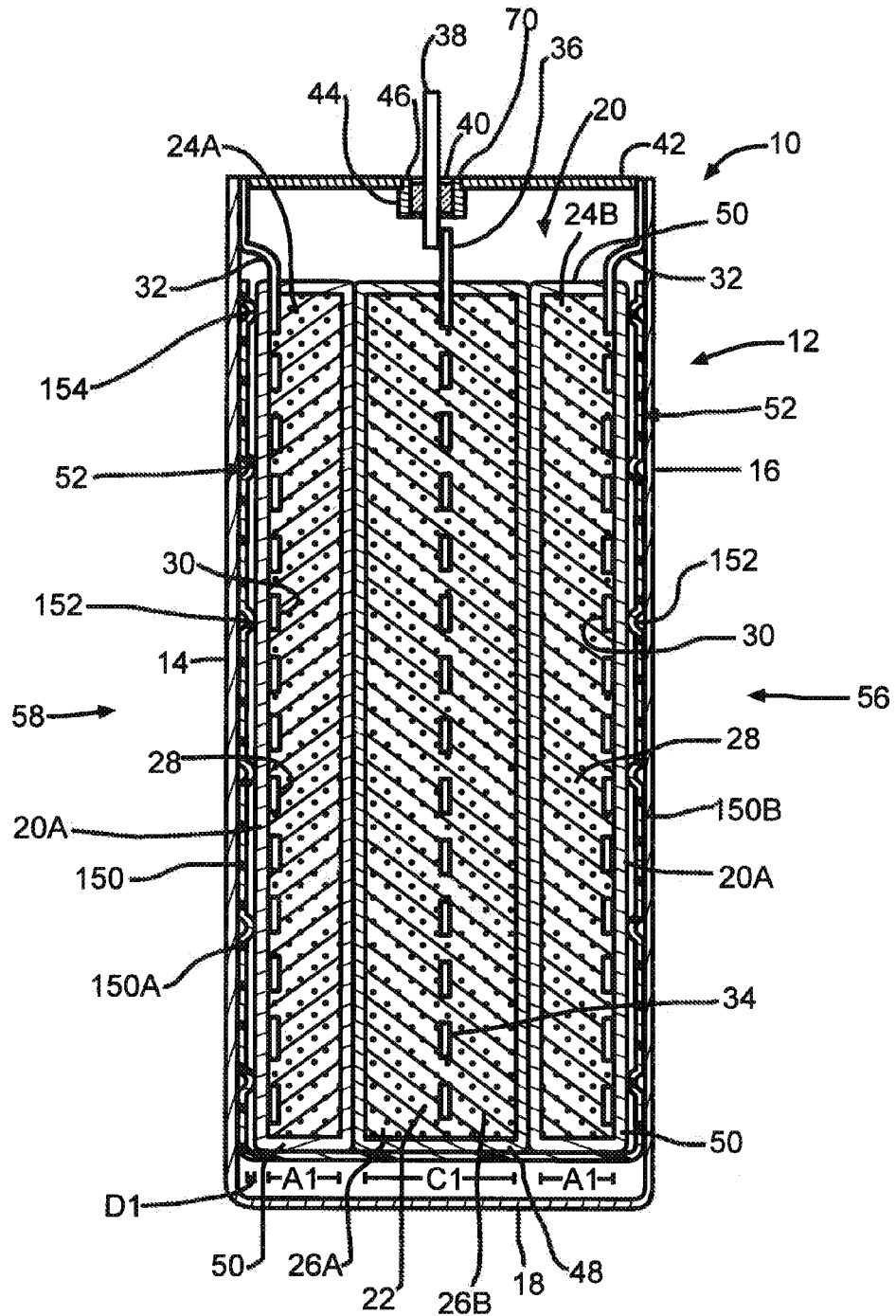
FIG. 2 is a cross-sectional view of FIG. 1 taken along the lines 2-2 and illustrates a first embodiment of an electrochemical cell of the present invention comprised of a first and second anode plates and cathode plates forming the electrode assembly, and a stack holder provided as a bag enclosing the electrode assembly.
Figure 2A:
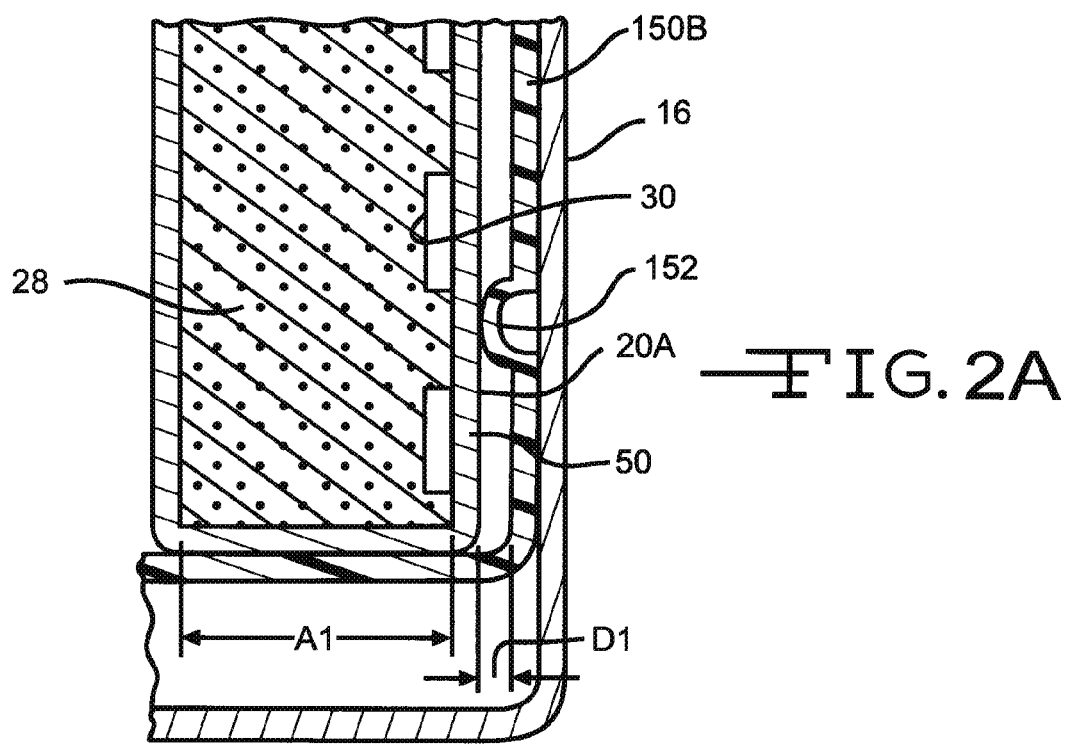
FIG. 2A is an enlarged section of FIG. 2 showing the gap D1 between the interior surface 150B of the stack holder's wall contacting surface 150 and the electrode assembly's exterior surface 20A at a first period of time.

Turning first to FIG. 1, an electrochemical cell 10 of either a primary or secondary, rechargeable chemistry is shown. The cell 10 is comprised of a conductive casing 12 having first and second opposed major face walls 14 and 16 joined to a surrounding side wall 18. The face walls 14, 16 and surrounding side wall 18, as illustrated at FIG. 2, form an open ended container that receives an electrode assembly 20, as will be described hereinafter. The open ended container 12 housing the electrode assembly 20 is then closed by a lid 42. The casing 12 and lid 42 may be comprised of materials such as stainless steel, mild steel, nickel-plated mild steel, titanium, tantalum or aluminum, but not limited thereto, so long as the metallic material is compatible for use with the other cell components and medically acceptable. The casing lid 42 is typically provided with a first opening 70 to accommodate a glass-to-metal seal 40/terminal pin feedthrough 38 (see FIGS. 1, 2, 3, 8, 8A and 9) and a second opening 72 for electrolyte filling (see FIG. 1).

Figure 9:
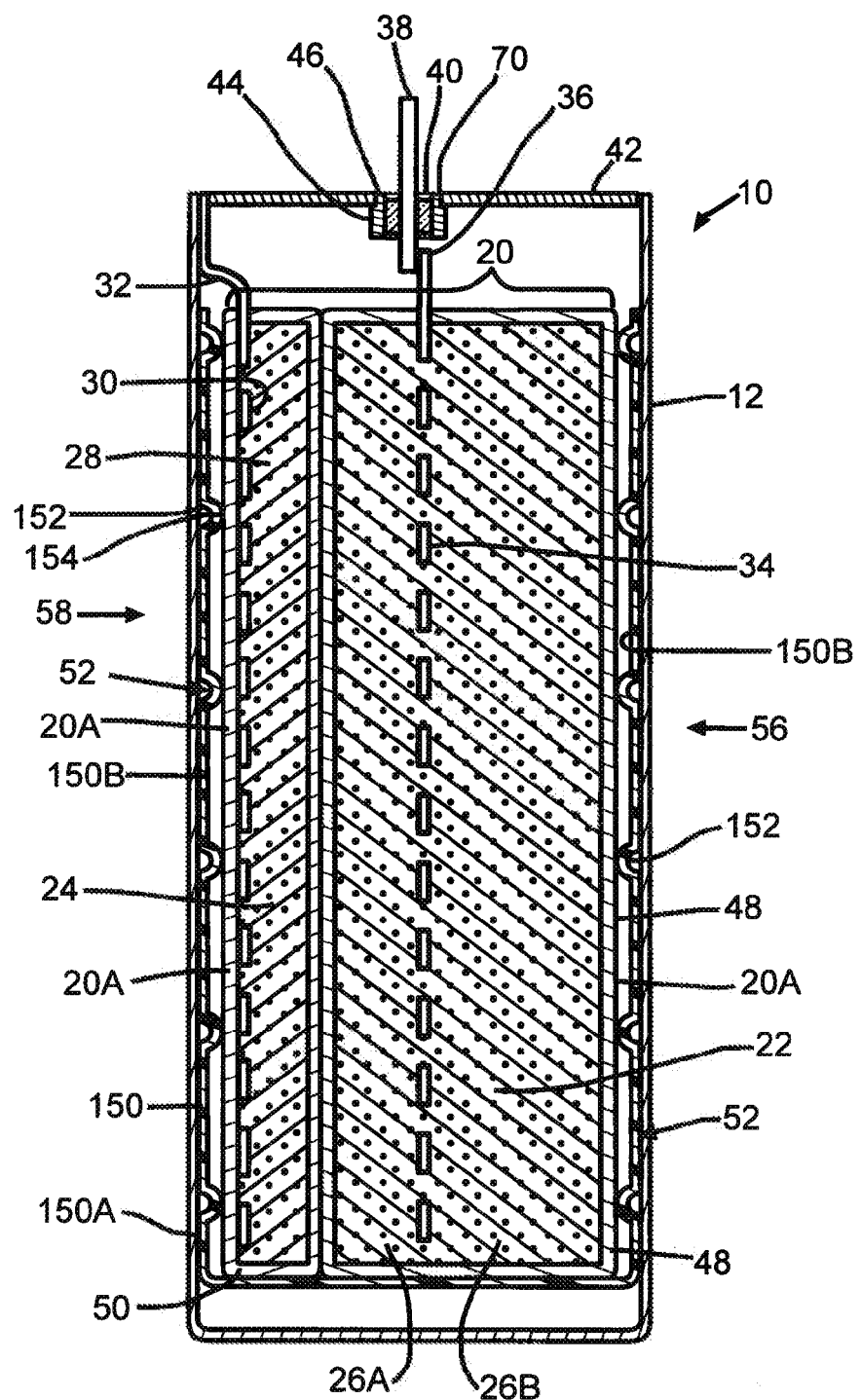
FIG. 9 is an alternative embodiment of FIG. 2.

The electrode assembly or electrode stack 20 comprises a cathode 22 and an anode 24 as shown in FIG. 9, or a first anode 24A, the cathode 22, and a second anode 24B as shown in FIG. 2. The anode 24, the first anode 24A and the second anode 24B are collectively referred to as anode 24. The electrode assembly 20 is housed within the casing 12. The cathode 22 is comprised of opposed plates 26A, 26B of cathode active material sandwiching a cathode current collector 34. Suitable cathode active materials include fluorinated carbon, silver vanadium oxide, copper silver vanadium oxide, $Ag_2O$, $Ag_2O_2$, $CuF_2$, $Ag_2CrO_4$, $MnO_2$, $V_2O_5$, $MnO_2$, $TiS_2$, $Cu_2S$, FeS, $FeS_2$, copper oxide, copper vanadium oxide, and mixtures thereof. Suitable cathode current collector materials are selected from the group consisting of stainless steel, titanium, tantalum, platinum, gold, aluminum, cobalt nickel alloys, nickel-containing alloys, highly alloyed ferritic stainless steel containing molybdenum and chromium, and nickel-, chromium- and molybdenum-containing alloys.

The anode 24 is comprised of a plate 28 of anode active material contacting one side of an anode current collector 30. The other, bare side of the anode current collector 30 resides adjacent, minus the separator and/or stack holder, to the casing major face wall 14 and/or 16. That is because only anode material directly facing the cathode material participates in cell discharge. For a primary cell, lithium and its alloys and intermetallic compounds, for example, Li—Si, Li—Al, Li—B and Li—Si—B alloys, are preferred for the anode active material. For a secondary cell, the anode is of a carbonaceous material, for example graphite, that is capable of intercalating and de-intercalating lithium ions. Preferably, the anode is a thin metal sheet or foil of lithium metal or graphite, pressed or rolled on a metallic anode current collector selected from titanium, titanium alloy, nickel, copper, tungsten or tantalum. Each anode current collector 30 includes a grounding tab 32 that is joined to the major face wall 14 and/or 16 of the casing 12.

Referring to FIGS. 2, 3, 8, 8A and 9, the cathode current collector 34 also includes a tab 36 that is joined to the terminal pin 38. The positive terminal pin 38 is typically of molybdenum. The insulative seal 40 surrounds the terminal pin 38 where it passes through the first opening 70 in the lid 42, sealing the terminal pin 38 and isolating it from electrical contact with the casing 12.

Seal 40 is preferably a glass-to-metal seal comprised of a ferrule 44 joined to the lid 42, and a bead 46 of fused glass bonded within the annulus between the ferrule 44 and the terminal pin 38. The ferrule 44 can be made of titanium although molybdenum, aluminum, nickel alloy and stainless steel are also suitable. The glass is of a corrosion resistant type having up to about 50% by weight silicon such as CABAL 12, TA 23, FUSITE 425 or FUSITE 435. Although the cell 10 shown in FIG. 1 is of a case-negative design, it is to be understood that the present invention is also applicable to cells of a case-positive design.

Cell 10 is further comprised of a first separator enveloping at least one of the cathode 22 and the anode 24. In the case-negative cell design shown in FIGS. 2, 3, 8, 8A and 9, the separator 48 envelopes the cathode plates 26, thereby insulating them from direct physical contact with the anode plate(s) 28 and the negative polarity casing 12. For the sake of redundancy, the cell 10 may further include second separators 50 that enclose each anode plate 28 as illustrated at FIGS. 2, 3, 8 and 8A. Furthermore, any one of the separators enclosing or enveloping the anode and the cathode may be of a single or double layer construction. That is in addition to the stack holder of the present invention, which will be described in detail hereinafter.

Each separator 48, 50 is an electrically insulative material. The electrically insulative material is chemically unreactive with the anode active materials and the cathode active materials and insoluble in the electrolyte. In addition, the separator material has a degree of porosity sufficient to allow flow there through of the electrolyte during electrochemical reactions of the cell. Illustrative separator materials include and are not limited to fabrics woven from fluoropolymeric fibers including polyvinylidine fluoride, polyethylenetetrafluoroethylene, and polyethylenechlorotrifluoroethylene used either alone or laminated with a fluoropolymeric microporous film, non-woven glass, polypropylene, polyethylene, glass fiber materials, ceramics, polytetrafluoroethylene membrane commercially available under the designation ZITEX (Chemplast Inc.), polypropylene membrane commercially available under the designation CELGARD (Celanese Plastic Company, Inc.) and a membrane commercially available under the designation DEXIGLAS (C. H. Dexter, Div., Dexter Corp.).

The cell 10 is thereafter filled with the electrolyte solution and hermetically sealed such as by close-welding a stainless steel ball over the second opening 72 in the lid 42 serving as a fill-hole. The electrolyte serves as a medium for migration of ions between the anode 24 and the cathode 22 during electrochemical reactions of the cell. For both a primary and secondary cell chemistry, electrochemical reaction at the electrodes involves conversion of ions in atomic or molecular forms which migrate from the anode 24 to the cathode 22. A suitable electrolyte has an inorganic, ionically conductive salt dissolved in a nonaqueous solvent, and more preferably, the electrolyte includes an ionizable lithium salt dissolved in a mixture of aprotic organic solvents comprising a low viscosity solvent and a high permittivity solvent. The inorganic, ionically conductive salt serves as the vehicle for migration of anode ions to intercalate or react with the cathode active materials. Suitable lithium salts include and are not limited to $LiPF_6$, $LiBF_4$, $LiAsF_6$, $LiSbF_6$, $LiClO_4$, $LiO_2$, $LiAlCl_4$, $LiGaCl_4$, $LiC(SO_2CF_3)_3$, $LiN(SO_2CF_3)_2$, $LiSCN$, $LiO_3SCF_3$, $LiC_6F_5SO_3$, $LiO_2CCF_3$, $LiSO_6F$, $LiB(C_6H_5)_4$, $LiCF_3SO_3$, and mixtures thereof.

Low viscosity solvents useful with the present invention include esters, linear and cyclic ethers and dialkyl carbonates such as tetrahydrofuran (THF), methyl acetate (MA), diglyme, trigylme, tetragylme, dimethyl carbonate (DMC), 1,2-dimethoxyethane (DME), 1,2-diethoxyethane (DEE), 1-ethoxy, 2-methoxyethane (EME), ethyl methyl carbonate (EMC), methyl propyl carbonate, ethyl propyl carbonate, diethyl carbonate (DEC), dipropyl carbonate, and mixtures thereof, and high permittivity solvents include cyclic carbonates, cyclic esters and cyclic amides such as propylene carbonate (PC), ethylene carbonate (EC), butylene carbonate, acetonitrile, dimethyl sulfoxide, dimethyl formamide, dimethyl acetamide, γ-valerolactone, γ-butyrolactone (GBL), N-methyl-pyrrolidinone (NMP), and mixtures thereof.

In order to maintain the electrode plates 26 and 28 in proper electrochemical close physical proximity alignment with each other during cell discharge, a stack holder 52 according to the present invention surrounds the electrode assembly 20. Referring to FIG. 2, in one embodiment the stack holder 52 is formed as a bag that receives and envelopes the electrode assembly 20 on all surfaces excluding the surface adjacent the lid 42. That is to maintain close physical proximity electrochemical alignment between the anode and cathode plates. In other embodiments, the stack holder 52 encases and envelopes the electric assembly except where the grounding tab and/or terminal pin are located. The stack holder 52 has a portion that contacts the interior surface of the casing's side walls 14, 16 and other portions contact the electrode assembly 20.

Figure 8:
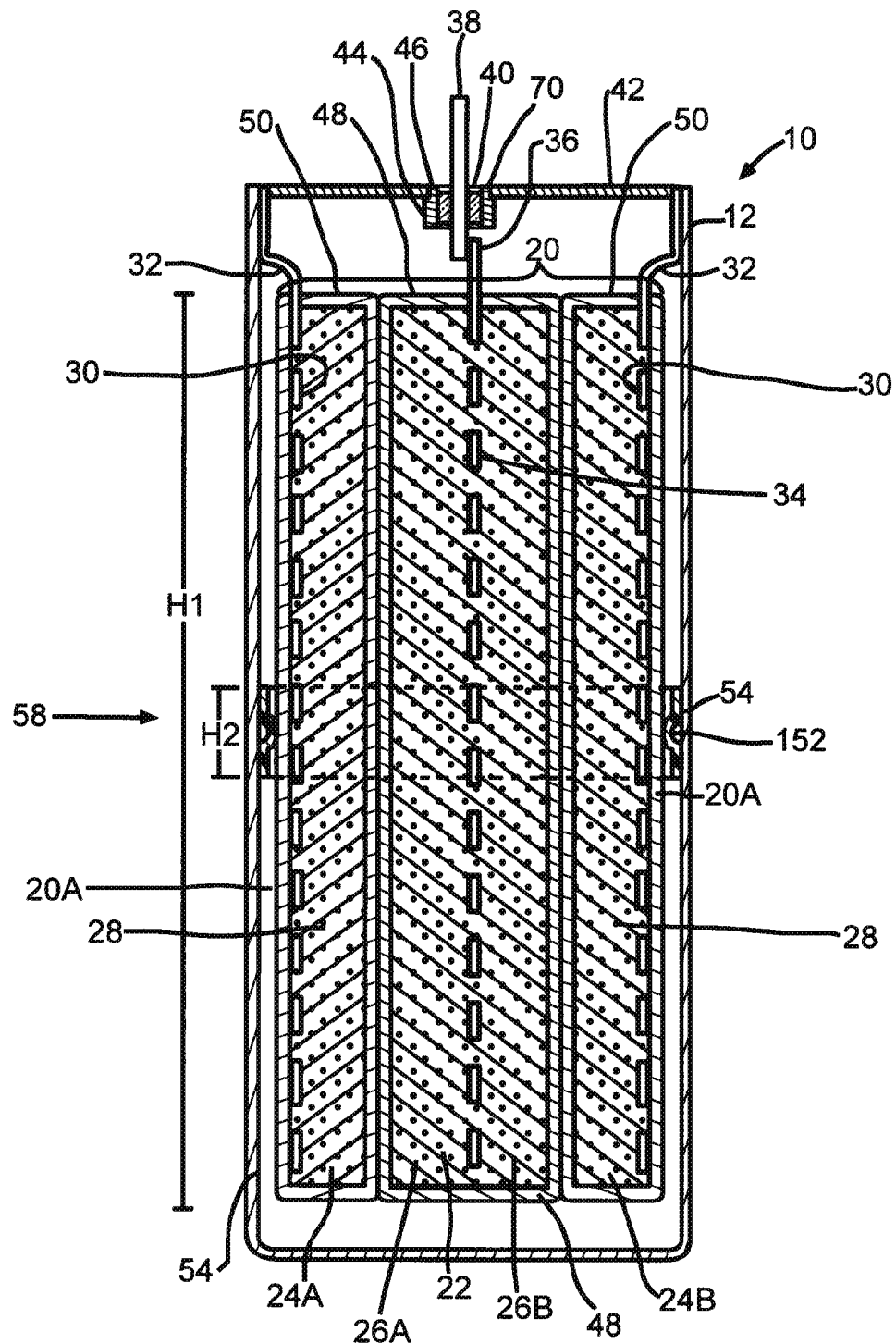
FIGS. 8 and 8A are cross-sectional views of the cell shown in FIG. 2, but illustrating alternate embodiments of band-type stack holders.

Referring next to FIG. 8, the stack holder may alternatively be formed as a band 54 disposed in an encircling relationship with a portion of the electrode assembly 20. As used herein with respect to a stack holder, the term "encircling" is meant to indicate that the stack holder is disposed around a portion of the perimeter of the electrode assembly 20 in an orientation such that it holds the two or more electrode plates in a compressive, face-to-face, close physical proximity alignment as the cell is discharged, as indicated by arrows 56 and 58 shown in FIGS. 2, 3, 8, 8A and 9. As long as it provides compressive forces to hold the electrode plates together in a close physical proximity, it is not necessary that the stack holder cover more of electrode assembly 20 (as the shown stack holder 52 does). The function of the stack holder 52, 54 is to maintain proper face-to-face electrochemical, close physical proximity alignment between the anode and cathode plates.

In that respect, FIG. 8 illustrates the electrode assembly 20 comprising the cathode 22 and anode 24 being aligned in a face-to-face, close physical proximity relationship suitable for acceptable electrochemical discharge. The electrode assembly 20 has a total height $H_1$ determined by measuring the cathode 22 and anode 24 from adjacent to the bottom wall 18 of the casing to adjacent the lid 42. The stack holder 54 encircles the circumference of the electrode assembly 20 and has a height $H_2$ that is at least 5% of $H_1$ to a maximum of 100% of $H_1$.

Figure 8A:
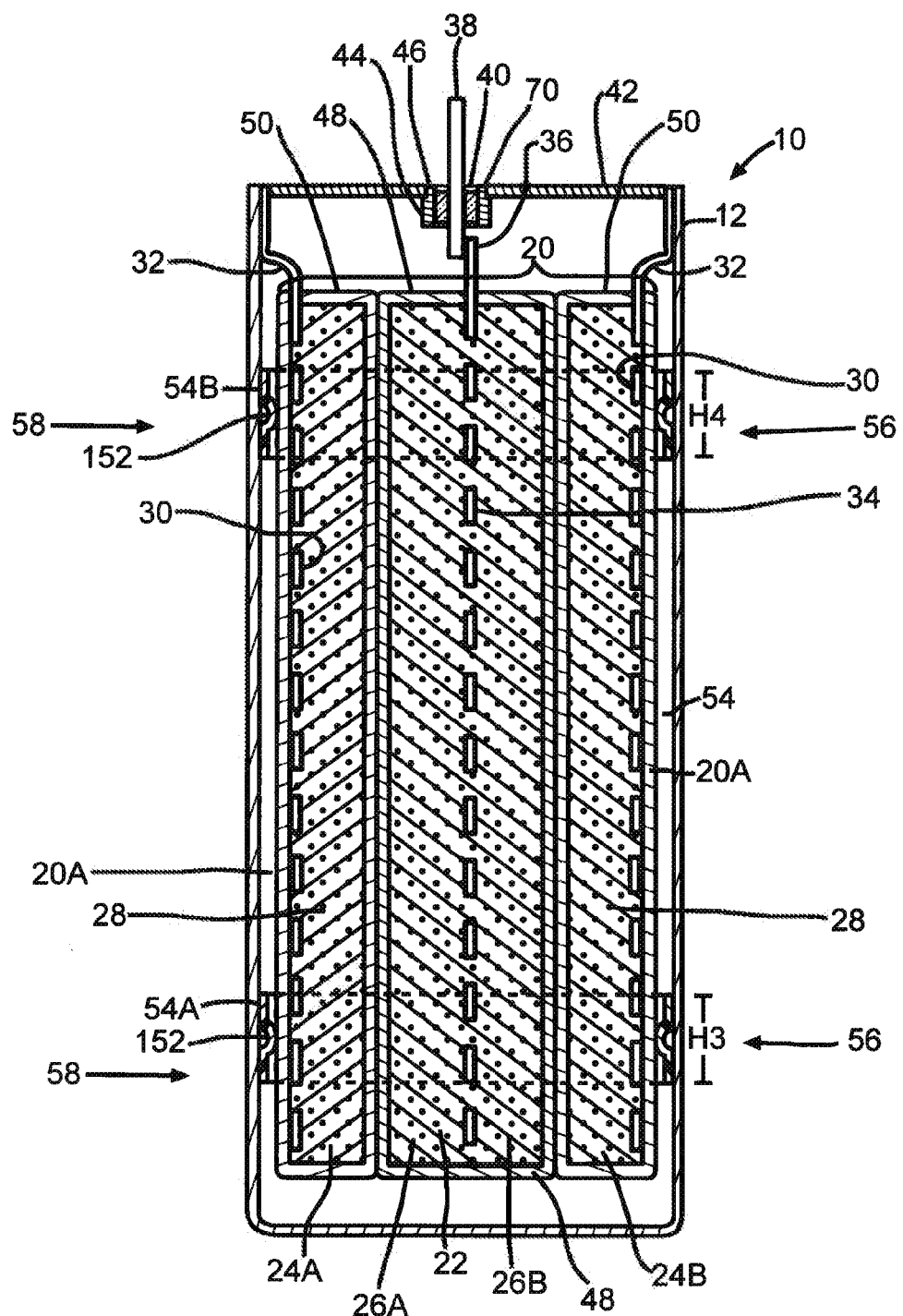

FIG. 8A illustrates another embodiment of cell 10 where stack holder 54 has been replaced by stack holders 54A and 54B. Stack holder 54A has a height $H_3$ and encircles the circumference of the electrode assembly 20 adjacent to the casing bottom wall 18 while stack holder 54B has a height $H_4$ and encircles the circumference of the electrode assembly adjacent to the lid 42. The respective heights $H_3$ and $H_4$ of the stack holders 54A and 54B can be less than the height of $H_2$ of stack holder 54 shown in FIG. 8 as long as their cumulative heights $H_3+H_4$ are at least 5% of the height $H_1$ of the electrode assembly to a maximum of 100% of $H_1$. Stack holders 54A and 54B can have the same or different heights.

It will also be apparent to those skilled in the art that while two stack holders 54A, 54B are shown in FIG. 8B, that should not be taken as limiting. Any number of band-type stack holders can be provided in a surrounding, encircling relationship with the electrode assembly 20, just as long as their cumulative heights are at least 5% of the total height of the electrode assembly.

The stack holders 52, 54, 54A and 54B (collectively referred to as stack holders 52) may be made of the same materials used for the separators 48 and 50. In one preferred embodiment, the stack holder material has a shape memory material capable of accommodating an initial expansion of the cathode that may occur at the early stage of cell discharge, and subsequent shrinkage of the electrode assembly 20 during later stages of cell discharge. The term shape memory is defined as a material that is capable of reverting to its original size and shape after a deformation force is removed.

Figure 3A:
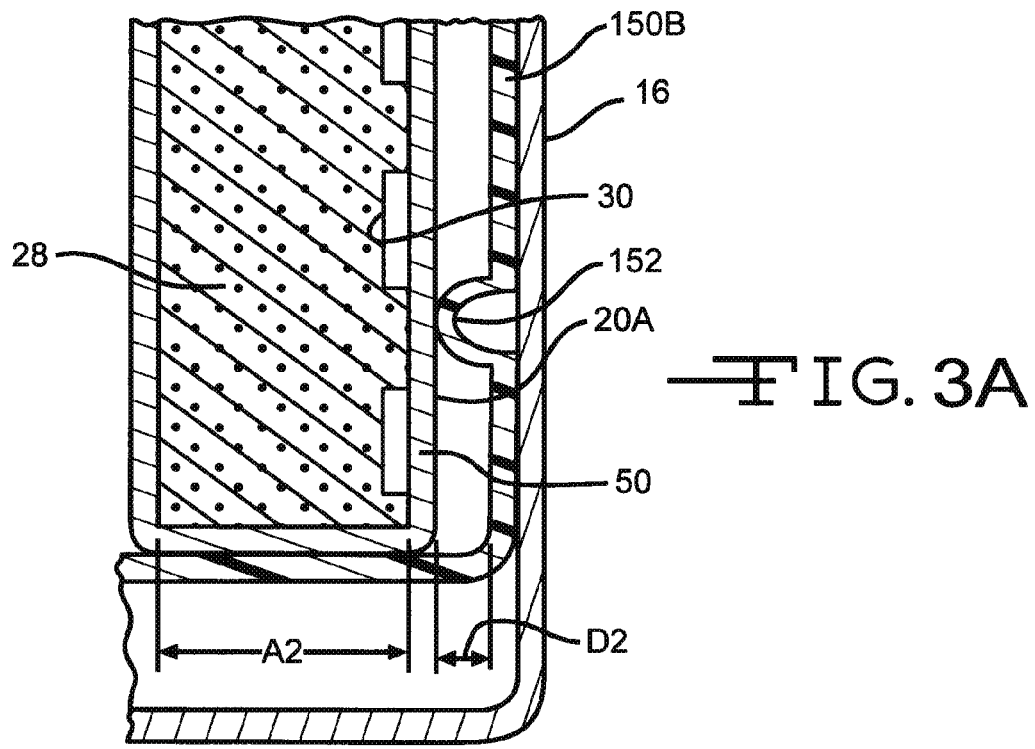
FIG. 3A is an enlarged section of FIG. 3 showing the gap D2 between the interior surface 150B of the stack holder's wall contacting surface 150 and the electrode assembly's exterior surface 20A at a second, later period of time.
Figure 3:
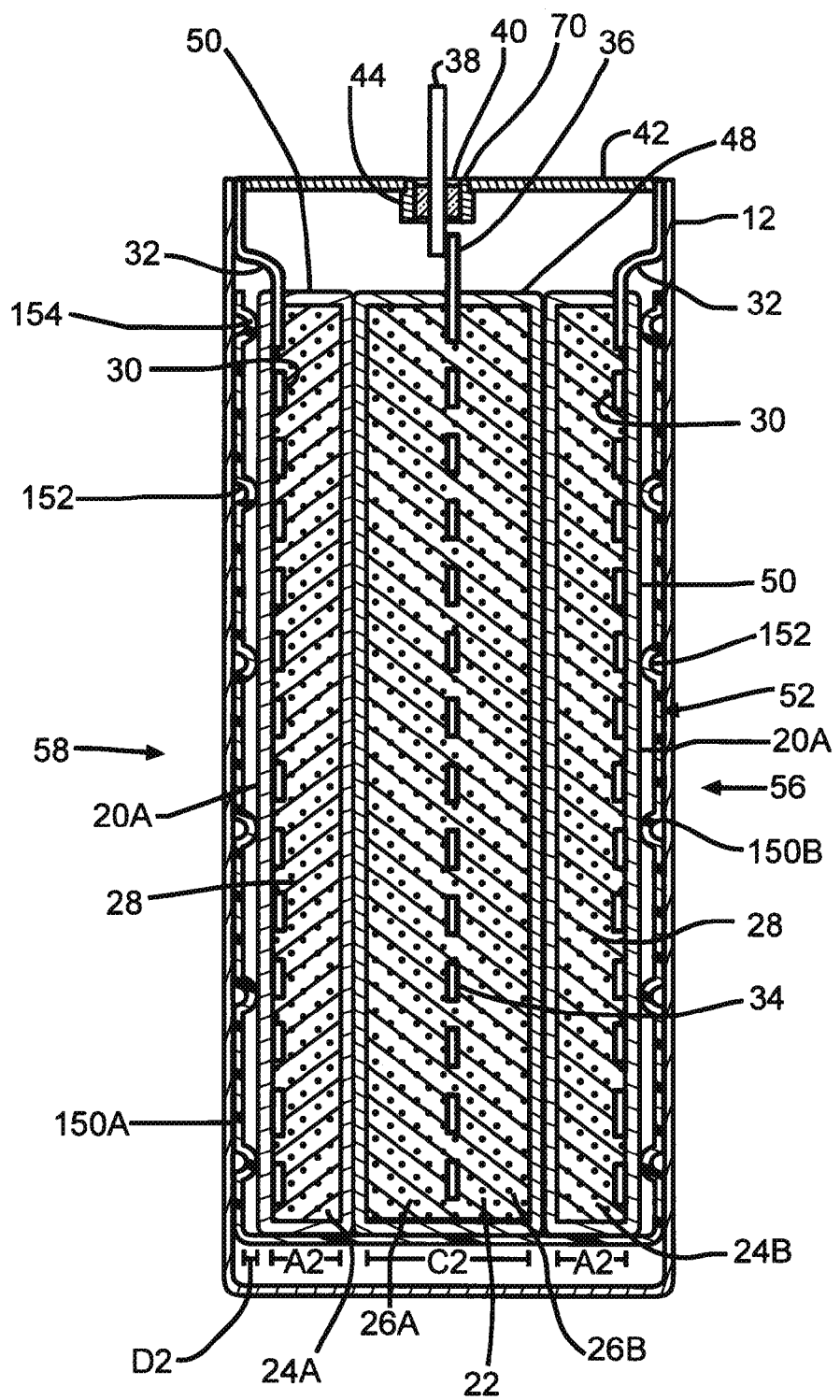
FIG. 3 is FIG. 2 over the discharge life in the case of a primary cell and, after numerous cell discharges in the case of a secondary cell.

An example of the shape memory is illustrated by comparing FIG. 2 to FIG. 3. FIG. 2 illustrates the electrode assembly 20 at a first period of time and FIG. 3 is FIG. 2 at a later period in its discharge life and, in the case of a secondary cell, after numerous cell discharge cycles. In FIG. 2, the anode plates and the cathode plates are surrounded by the stack holder 52. The stack holder 52 is firmly positioned in the casing 12 and has a portion that contacts the face walls 14, 16 and a portion that contacts the electrode assembly 20.

Figure 5:
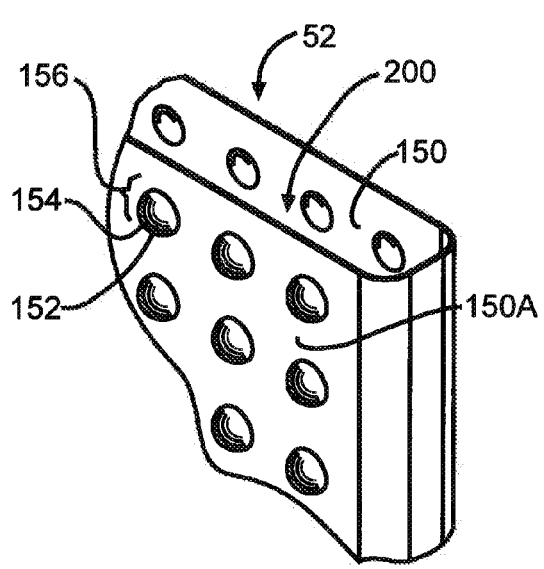
FIGS. 5 to 7 illustrate alternative embodiments of a portion of the stack holder shown in FIG. 4.
Figure 6:
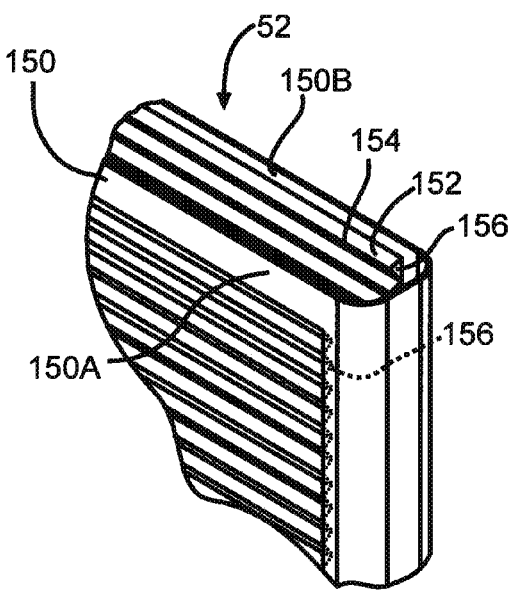
Figure 7:
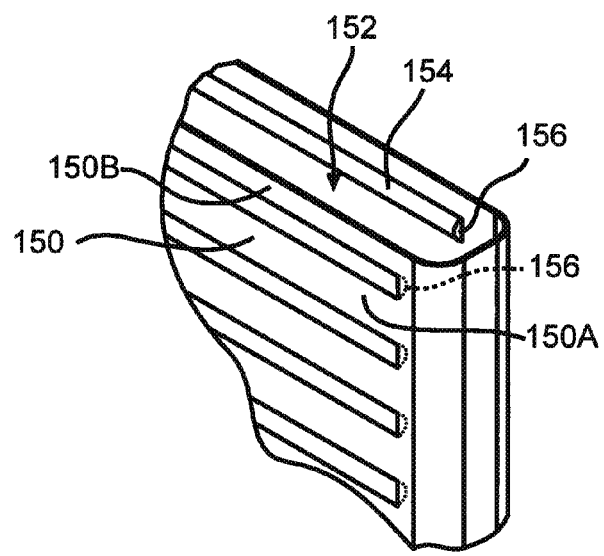

The stack holder 52 (along with 54, 54A and 54B) has a wall contacting surface 150 and a plurality of protrusions 152. Each protrusion 152 has a force contacting surface 154, and an extension area 156 (FIGS. 4 to 7) positioned between the wall contacting surface 150 and the force contacting surface 154. Each protrusion 152 can be a dimple as illustrated at FIGS. 2, 3, 4, 5, 8, 8A, and 9 or variations thereof which include conical, cylindrical, cubic, polygonic, or rounded shapes that are randomly spaced; an extended embodiment of the dimple, conical, cylindrical, cubic, polygonic, or rounded shapes which are adjacent to another protrusion as illustrated at FIG. 6; an extended embodiment of the dimple, conical, cylindrical, cubic, polygonic, or rounded shapes which are spaced a predetermined distance from another protrusion as illustrated at FIG. 7; or combinations or mixtures thereof.

Figure 4:
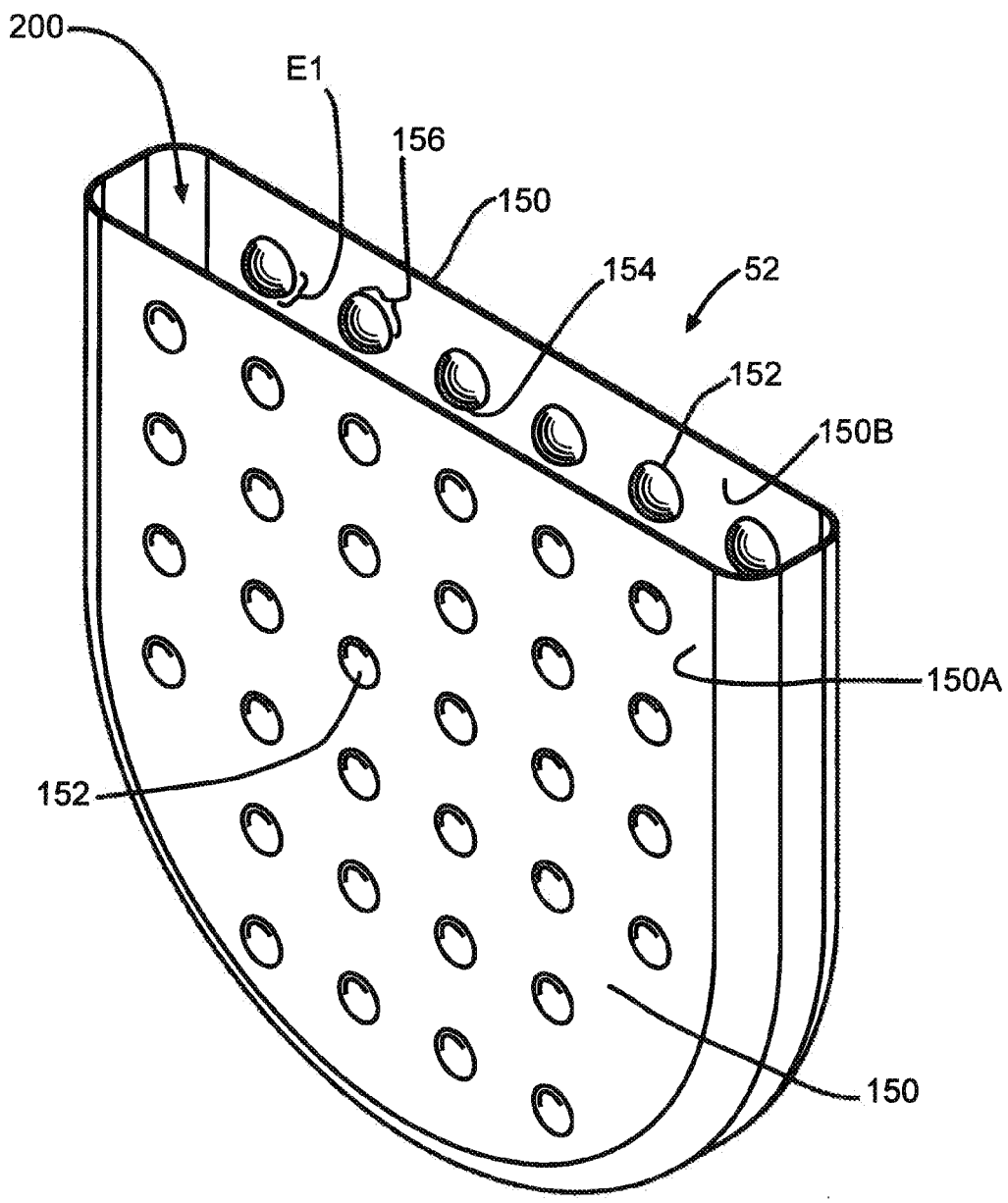
FIG. 4 illustrates one embodiment of a stack holder.

A characteristic of each protrusion 152 is that it has a maximum extension E1 as shown in FIG. 4. The maximum extension E1 is designed to exceed the maximum gap space between the interior surface 150B of the stack holder's wall contacting surface 150 and the electrode assembly's exterior surface 20A over the cell's 10 discharge life. The protrusion 152, which is made from a shape memory material, should not reach maximum extension E1 when it is in the casing 12. If the protrusion 152 reaches maximum extension E1 and the gap between the wall contacting surface's 150 interior surface 150B and the electrode assembly's exterior surface 20A exceeds the maximum extension E1, then the protrusions 152, in that rare instance, may not provide the desired compressive force against the electrode assembly 20. Without the desired compressive force being applied, the electrode assembly may not retain the appropriate close physical proximity between the anode and the cathode plates for maximum cell discharge efficiency. Accordingly, the protrusion's maximum extension E1 is designed to exceed the maximum gap space between the wall contacting surface's 150 interior surface 150B and the electrode assembly's exterior surface 20A over the cell's 10 discharge life.

The stack holder 52 is positioned over the electrode assembly 20. As previously identified, the electrode assembly 20 can include and is not limited to: (a) the anode plate 24, the cathode plate 26 and a separator positioned between the plates (see FIGS. 2, 3, 8, 8A and 9); (b) the anode plate 24 and the separator 50, and the cathode plate 26; (c) the cathode plate and the separator 48, and the anode plate 24 (see FIG. 9); and (d) the anode plate 24 and the separator 50, and the cathode plate and the separator 48 (see FIGS. 2, 3, 8 and 8A). Additional anode plates and cathode plates can be used so long as they comply with the format of an anode plate being separated from direct physical contact with a cathode plate.

After the stack holder 52 and the electrode assembly 20 are inserted into the case 12, the wall contacting surface's 150 exterior surface 150A contacts the case wall 14, 16 and at least portions of side wall 18 and, in some embodiments, the lid 42. Where there is a protrusion 152 near the wall contacting surface, the wall contacting surface's 150 interior surface 150B does not normally contact the electrode assembly's exterior surface 20A. Nonetheless, after at least partial cell discharge, a first gap D1 may form between the wall contacting surface's 150 interior surface 150B and the electrode assembly's exterior surface 20A. That gap D1 is illustrated in FIG. 2. At a greater depth of discharge, the first gap D1 expands to a second gap D2 as illustrated in FIG. 3.

The first gap D1 between the interior surface 150B of the stack holder's wall contacting surface 150 and the electrode assembly's exterior surface 20A is smaller than the second gap D2. The second gap D2 is larger because as a primary cell is discharged through its useful life and, in the case of a secondary cell, after numerous discharge cycles, the cathode's width C1 (see FIG. 2) expands to width C2 (see FIG. 3), i.e. C1>C2, at a slower rate than the thinning of the anode's width A1 (see FIG. 2) to width A2 (see FIG. 3), i.e. A1<A2. That discrepancy in the cathode's expansion rate and the anode's thinning rate results in the gap increasing in size over time as illustrated by comparing the first gap D1 (FIG. 2) to the second gap D2 (FIG. 3), i.e. D2>D1.

Despite the first gap D1 (FIG. 2) being less than the second gap D2 (FIG. 3), the stack holder 52 still contacts the electrode assembly's exterior surface 20A through the protrusion 152, as illustrated at FIGS. 2 and 3. Each protrusion 152 illustrated at FIGS. 2 and 3, is not at its maximum extension E1. In that manner, each protrusion 152 applies a compressive force upon the electrode assembly's exterior surface 20A through the force contacting surface 154. The collective compressive force of each protrusion results in the electrode assembly 20 being maintained in the proper and desired close physical proximity position.

Obviously the reverse structure can be made as well. In the reverse embodiment, the protrusions 152 apply a force upon the casing walls and the wall contacting surface 150 contacts the electrode assembly's walls. An example of a stack holder 52 illustrating those capabilities is illustrated in FIG. 5.

Suitable materials that are also useful for the stack holders 52, 54, 54A and 54B are the same materials that are used for separators 48, 50, preferably fluoropolymeric materials including polyvinylidine fluoride, polyethylenetetrafluoroethylene, ethylenetetrafluoroethylene (ETFE) and polyethylenechlorotrifluoroethylene used either alone or laminated with a fluoropolymeric microporous film, non-woven glass, polypropylene, polyethylene, ceramics, polytetrafluoroethylene membrane commercially available under the designation ZITEX (Chemplast Inc.), polypropylene membrane commercially available under the designation CELGARD (Celanese Plastic Company, Inc.) and a membrane commercially available under the designation DEXIGLAS (C. H. Dexter, Div., Dexter Corp.). These materials can be provided in a bi-layer or tri-layer construction. An example is a tri-layer polymeric material of polypropylene/polyethylene/polyethylene (PP/PE/PE).

While woven fabrics of the above materials are generally preferred for the cell separators, that type of construction is not necessarily favored for the stack holder of the present invention. Instead of a loose fabric, which is desired for permitting ion flow there through, the stack holder preferably has a uniformly closed and coherent texture. That's because such solid-type materials have better shape memory characteristics. A most preferred material for the stack holder is solid, non-woven ETFE having a thickness of about 0.005 inches.

In fabrication of a stack holder according to the present invention, the stack holder material may be wrapped around the electrode assembly 20 and held under tension in a fixture to allow the protrusions 152 to provide compressive forces against the electrode plates 26 and 28. The stack holder material may be heat sealed in a manner similar to that used to fabricate individual electrode plate separators 48 and 50. Alternatively, the electrode assembly 20 can be inserted into a cavity 200 of the stack holder 52.

The stack holder 52 can obtain the protrusions through numerous possible methods. One exemplary method is to use a conventional insulator bag having an opening and the interior of the insulator bag defines the cavity 200. The insulator bag is positioned around a tongue depressor instrument. The tongue depressor instrument directs the insulator bag toward a heated plate. The heated plate is at a temperature just below the melting temperature of the insulator bag and has mirror image protrusion forms. Upon contact with the heated plate, the insulator bag forms into the stack holder 52 with the protrusions 152 extending in the desired direction and having the desired shape and spacing.

As long as they are shape memory material, the stack holders may also be made from non-porous materials that are not typically used to construct cell separators. Examples are polyimide tape and polypropylene tape. The difference between these tapes and the previously mentioned separator materials is that the former are non-porous and contain adhesives. As used herein, the term "porous" refers to a material that has sufficient permeability to permit an acceptable degree of ion flow there through to support electrochemical discharge. On the other hand, a non-porous material may have some permeability, but not to a degree sufficient to permit ion flow to sustain an electrochemical discharge.

In other embodiments, either or both of the anode and cathode may be comprised of a plurality of plates of their respective electrode active materials. Each of the respective plates of electrode active material may be enveloped in its own separator, with the entire electrode assembly being further encircled by an elastic stack holder. One exemplary cell comprised of multiple electrode plates is shown in FIG. 2.

It is noted that the exemplary cell 10 of respective FIGS. 2 to 3 are comprised of individual electrode plates that are typically fabricated separately. However, the present invention is not to be construed as limited to such an electrode configuration. Other cells having serpentine or jellyroll electrode configurations may be provided with a stack holder in accordance with the present invention. Therefore, the term "electrode plate" used herein is meant to indicate any structure of electrode active material that is alignable in a substantially face-to-face orientation or alignment with one or more adjacent portions of an opposite polarity electrode active material in a close physical proximity.

It is, therefore, apparent that an electrochemical cell is provided with a stack holder that surrounds the electrode assembly or cell stack thereof. The stack holder maintains the desired face-to-face electrical alignment between the opposite polarity electrode plates as the cell is discharged. While this invention has been described in conjunction with preferred embodiments thereof, it is evident that many alternatives, modifications, and variations will be apparent to those skilled in the art. Accordingly, the present invention is intended to embrace all such alternatives, modifications and variations that fall within the broad scope of the appended claims.

What is claimed is:

1. An electrochemical cell, comprising:
   a) a casing;
   b) an electrode assembly housed inside the casing, the electrode assembly comprising:
      i) a cathode comprised of at lea a first cathode plate of cathode active material, wherein the first cathode plate comprises a cathode edge extending to opposed cathode faces;
      ii) an anode comprised of at least a first anode plate of anode active material, wherein the anode plate comprises an anode edge extending to opposed anode faces; and
      iii) a first separator disposed at an intermediate location between the first anode plate and the first cathode plate to prevent them from direct physical contact between the anode and the cathode; and
   c) a stack holder surrounding at least a portion of the electrode assembly, the stack holder comprising an interior surface spaced apart from an exterior surface by a thickness having a perimeter edge, wherein at least one of the interior and exterior stack holder surfaces supports at least one protrusion comprising an extension portion extending outwardly from the at least one of the interior and exterior surfaces to an apex providing a force contacting surface that is in direct physical contact with at least one of the anode faces and the cathode faces of the electrode assembly or with the separator contacting the anode or the cathode,
   d) wherein an imaginary longitudinal axis intersecting an imaginary plane of the interior or exterior surface of the stack holder and extending to the apex of the protrusion intersects the at least one face of the anode and the cathode substantially at a normal orientation therewith to thereby provide a compressive force to ensure the anode and the cathode maintain a close physical proximity to each other.

2. The electrochemical cell of claim 1 wherein the stack holder is a bag enveloping the electrode assembly, the bag being distinct from the separator.

3. The electrochemical cell of claim 1 wherein the first separator is of either a single or double layer construction.

4. The electrochemical cell of claim 1 wherein the stack holder is at least one band-type stack holder encircling a perimeter of the electrode assembly.

5. The electrochemical cell of claim 4 wherein the band-type stack holder encircling the electrode assembly has a first height ranging from about 5% to 100% of a height of the electrode assembly.

6. The electrochemical cell of claim 1 wherein there are at least two band-type stack holders encircling the electrode assembly.

7. The electrochemical cell of claim 6 wherein one of the band-type stack holders encircles the electrode assembly adjacent to a bottom of the casing and the other encircles the electrode assembly adjacent to the lid.

8. The electrochemical cell of claim 6 wherein the at least two band-type stack holders encircling the electrode assembly have a cumulative height ranging from about 5% to 100% of a second height of the electrode assembly.

9. The electrochemical cell of claim 6 wherein the at least two band-type stack holders encircling the electrode assembly have the same or different heights.

10. The electrochemical cell of claim 1 wherein the stack holder is of a shape memory material.

11. The electrochemical cell of claim 1 wherein the stack holder is of a material selected from the group consisting of ethylenetetrafluoroethylene, polyvinylidine fluoride, polyethylenetetrafluoroethylene, polyethylenechlorotrifluoroethylene, polytetrafluoroethylene, polypropylene, polyethylene, polyimide, glass fiber, ceramic fiber, and laminates thereof.

12. The electrochemical cell of claim 1 wherein the stack holder is of a material that is either porous or non-porous.

13. The electrochemical cell of claim 1 wherein the electrode assembly is further comprised of a second separator enveloping the other of the first plate of cathode active material and the first plate of anode active material.

14. The electrochemical cell of claim 1 wherein the anode is comprised of a plurality of anode plates of anode active material and the cathode is comprised of a plurality of cathode plates of cathode active material.

15. The electrochemical cell of claim 1 wherein the anode is comprised of an anode current collector electrically connected to the casing being of a conductive material, and the cathode is comprised of a cathode current collector joined to a conductive terminal pin passing through an insulative seal in the casing.

16. The electrochemical cell of claim 1 wherein the protrusion has a shape selected from the group consisting of a dimple shape, a conical shape, a cylindrical shape, a cubic shape, a polygonic shape, a rounded shape, an extended dimple shape, an extended conical shape, an extended cylindrical shape, an extended cubic shape, an extended polygonic shape, an extended rounded shape, and combinations thereof.

17. An electrochemical cell, comprising:
   a) a conductive casing comprising a surrounding side wall extending to an open end closed by a second casing member;
   b) an electrode assembly housed inside the casing, the electrode assembly comprising:
      i) a cathode comprised of at least a first cathode plate of cathode active material and a cathode separator enveloping the first cathode plate, wherein the first cathode plate comprises a cathode edge extending to opposed cathode faces;
      ii) an anode comprised of at least a first anode plate of anode active material, wherein the anode plate comprises an anode edge extending to opposed anode faces; and
      iii) a separator segregating the first cathode plate from direct physical contact with the first anode plate; and
   c) a stack holder surrounding the electrode assembly, the stack holder comprising an interior surface spaced apt from an exterior surface by a thickness having a perimeter edge, wherein at least one of the interior and exterior stack holder surfaces supports at least one protrusion comprising an extension portion extending outwardly from the at least one of the interior and exterior surfaces to an apex providing a force contacting surface that is in direct physical contact with at least one of the anode faces and the cathode separator laying against one of the cathode faces, d) wherein an imaginary longitudinal axis intersecting an imaginary plane of the interior or exterior surface of the stack holder and extending to the apex of the protrusion intersects the at least one face of the anode and the cathode substantially at a normal orientation therewith to there provide a compressive force to ensure the anode and the cathode maintain a close physical proximity to each other.

18. A method for providing an electrochemical cell, comprising the steps:
a) providing a casing;
b) housing an electrode assembly inside the casing, the electrode assembly comprising:
   i) a cathode comprised of at least a first cathode plate of cathode active material;
   ii) an anode comprised of at least a first anode plate of anode active material; and
   iii) a first separator disposed at an intermediate location between the first cathode plate and the first anode plate to prevent them from direct physical contact with each other; and
c) encircling at least a portion of the electrode assembly with a stack holder comprising an interior surface spaced apart from an exterior surface by a thickness having a perimeter edge, wherein at least one of the interior and exterior stack holder surfaces supports at least one protrusion comprising an extension portion extending outwardly from the at least one of the interior and exterior surfaces to an apex providing a force contacting surface in direct physical contact with at least one of the anode faces and the cathode faces of the electrode assembly or with the separator contacting the anode or cathode, wherein an imaginary longitudinal axis intersecting an imaginary plane of the interior or exterior surface of the stack holder and extending to the apex of the protrusion intersects the at least one face of the anode and the cathode substantially a normal orientation therewith to thereby provide a compressive force upon the electrochemical cell to ensure the anode and the cathode maintain a close physical proximity to each other; and
d) activating the electrode assembly with an electrolyte filled in the casing.

19. The method of claim 18 including providing the stack holder as a bag enveloping the electrode assembly, the bag being distinct from the separator.

20. The method of claim 18 including providing the first separator being of either a single or double layer construction.

21. The method of claim 18 including providing the stack holder as at least one band-type stack holder encircling a perimeter of the electrode assembly.

22. The method of claim 21 including providing the band-type stack holder encircling the electrode assembly having a height ranging from about 5% to 100% of a first height of the electrode assembly.

23. The method of claim 18 including providing at least two band-type stack holders encircling the electrode assembly.

24. The method of claim 23 including providing one of the band-type stack holders encircling the electrode assembly adjacent to a bottom of the casing and the other encircling the electrode assembly adjacent to the lid.

25. The method of claim 23 including providing the at least two band-type stack holders encircling the electrode assembly having a cumulative height ranging from about 5% to 100% of a second height of the electrode assembly.

26. The method of claim 23 including providing the at least two band-type stack holders encircling the electrode assembly having the same or different heights.

27. The method of claim 18 including providing the stack holder of a shape memory material.

28. The method of claim 18 including selecting the stack holder from the group consisting of ethylenetetrafluoroethylene, polyvinylidine fluoride, polyethylenetetrafluoroethylene, polyethylenechlorotrifluoroethylene, polytetrafluoroethylene, polypropylene, polyethylene, polyimide, glass fiber, ceramic fiber, and laminates thereof.

29. The method of claim 18 including providing the stack holder of either a porous or non-porous material.

30. The method of claim 18 including providing the protrusion having a shape selected from the group consisting of a dimple shape, a conical shape, a cylindrical shape, a cubic shape, a polygonic shape, a rounded shape, an extended dimple shape, an extended conical shape, an extended cylindrical shape, an extended cubic shape, an extended polygonic shape, an extended rounded shape, and combinations thereof.

31. A stack holder for an electrochemical cell, the stack holder comprising:
an interior surface spaced apart from an exterior surface by a thickness having a perimeter edge, wherein at least one of the interior and exterior stack holder surfaces supports at least one protrusion comprising an extension portion extending outwardly from the at least one of the interior and exterior surfaces to an apex providing a force contacting surface and wherein the extension portion of the protrusion is completely bounded by either the interior or the exterior surface, as the case may be.

* * * * *

UNITED STATES PATENT AND TRADEMARK OFFICE
CERTIFICATE OF CORRECTION

PATENT NO. : 8,580,439 B1
APPLICATION NO. : 12/561668
DATED : November 12, 2013
INVENTOR(S) : Donald F. Kaiser and Gregory A. Voss Page 1 of 1

It is certified that error appears in the above-identified patent and that said Letters Patent is hereby corrected as shown below:

In the Claims:

Column 9, line 24 (Claim 1, line 5) delete "lea" and insert --least--

Column 10, line 65 (Claim 17, line 19) delete "apt" and insert --apart--

Column 11, line 44 (Claim 18, line 29) after the word "substantially" insert the word --at--

Column 12, line 34 (Claim 30, line 1) delete "18" and insert --17--

Signed and Sealed this
First Day of July, 2014

Michelle K. Lee
*Deputy Director of the United States Patent and Trademark Office*